United States Patent
Bushey

(10) Patent No.: US 8,438,701 B2
(45) Date of Patent: May 14, 2013

(54) FORMED HYBRED FLOOR GLIDE

(76) Inventor: Richard D. Bushey, Kenosha, WI (US)

( * ) Notice: Subject to any disclaimer, the term of this patent is extended or adjusted under 35 U.S.C. 154(b) by 0 days.

(21) Appl. No.: 13/406,094

(22) Filed: Feb. 27, 2012

(65) Prior Publication Data

US 2012/0167346 A1 Jul. 5, 2012

Related U.S. Application Data

(63) Continuation of application No. 12/178,012, filed on Jul. 23, 2008, now abandoned.

(51) Int. Cl.
*A47B 91/06* (2006.01)

(52) U.S. Cl.
USPC ............................................ 16/42 T; 16/42 R

(58) Field of Classification Search .................. 16/42 R, 16/42 T; 248/188.8, 188.9, 188.3, 346.07
See application file for complete search history.

(56) References Cited

U.S. PATENT DOCUMENTS

| | | | |
|---|---|---|---|
| 1,903,609 A * | 4/1933 | Uhl ............................... | 16/42 R |
| 2,699,628 A | 1/1955 | Auer | |
| 2,787,085 A | 4/1957 | Auer | |
| 2,865,133 A * | 12/1958 | Hoven et al. ............... | 248/188.9 |
| 2,899,703 A | 8/1959 | Johnson | |
| 3,050,770 A | 8/1962 | Morse et al. | |
| 3,362,040 A | 1/1968 | Gurzenda | |
| 3,484,891 A | 12/1969 | Borgen | |
| 3,741,226 A * | 6/1973 | Urban ............................ | 135/84 |
| 3,969,786 A | 7/1976 | Peak | |
| 3,994,043 A | 11/1976 | Gurzenda | |
| 5,081,740 A | 1/1992 | Smith | |
| 5,220,705 A | 6/1993 | Bushey | |
| 5,426,818 A | 6/1995 | Bushey | |
| D368,022 S | 3/1996 | Angle | |
| 5,557,824 A | 9/1996 | Bushey | |
| 5,581,844 A | 12/1996 | Raheb et al. | |
| 5,603,141 A | 2/1997 | Gledill | |
| 5,689,853 A | 11/1997 | Lemmer | |
| 6,295,697 B1 | 10/2001 | Simon | |
| 6,405,982 B2 | 6/2002 | Ferencz | |
| D513,169 S | 12/2005 | Bushey | |
| 7,533,858 B2 * | 5/2009 | Straus ......................... | 248/188.8 |
| 2003/0163894 A1 | 9/2003 | Jones et al. | |
| 2005/0034268 A1 | 2/2005 | Wurdack | |
| 2005/0081330 A1 | 4/2005 | Edwards | |
| 2005/0115022 A1 | 6/2005 | Desmarais | |
| 2008/0042025 A1 | 2/2008 | Brouard et al. | |
| 2008/0258023 A1 | 10/2008 | Desmarais | |

* cited by examiner

*Primary Examiner* — Chuck Y. Mah
(74) *Attorney, Agent, or Firm* — Boyle Fredrickson, S.C.

(57) ABSTRACT

A furniture glide is provided that is mountable on the terminal end of a furniture leg having an outer surface. The furniture glide includes a cup having an outer surface and an inner surface defining a cavity for receiving the furniture leg. Matted material is molded into the outer surface of the cup.

13 Claims, 3 Drawing Sheets

FORMED HYBRED FLOOR GLIDE

CROSS-REFERENCE TO RELATED APPLICATION

This application is a continuation of application Ser. No. 12/178,012 filed Jul. 23, 2008 now abandoned.

FIELD OF THE INVENTION

This invention relates generally to furniture glides, and in particular, to a formed hybrid furniture glide that accommodates furniture legs of different diameters.

BACKGROUND AND SUMMARY OF THE INVENTION

Coasters are often used under the legs of a piece of furniture to act as a buffer between the legs and the floor on which the piece of furniture rests. Typically, coasters take the form of glass or rubber discs having flat bottoms that rest on the floor. By positioning the coasters between the furniture legs and the floor, the weight of the furniture leg is dispersed over a larger area such that the furniture leg does not scratch or mar the floor when the piece of furniture is moved or leave a depression in the floor when the piece of furniture remains in one place for an extended period of time.

In addition, furniture glides or sliders have been developed that are also positioned between the legs of a piece of furniture and the carpeting on which the piece of furniture rests. By way of example, Bushey, U.S. Pat. No. 5,220,705 discloses a furniture glide that facilitates the movement of a piece of furniture on carpeted and bare floors. The furniture glide includes a convo-convex disc having an arcuate convex lower surface, a concave upper surface defining a central cavity, and resilient pad fixed to the disc upper surface within the central cavity below the edge thereof. Adhesive is provided for securing the resilient pad to the bottom of the piece of furniture or to the leg of the piece of furniture.

While functional for its intended purpose, the furniture glide disclosed in the Bushey '705 patent has certain limitations. More specifically, repeated movement of a piece of furniture along a floor may cause the adhesive to fail such that the resilient pad becomes detached from the bottom of the piece of furniture. As a result, the furniture glide may become separated from the piece of furniture such that the bottom of piece of furniture may engage and damage the flooring. Therefore, it is highly desirable to provide a furniture glide and/or coaster that may be simply secured to a bottom of a piece of furniture to prevent damage to the flooring on which the piece of furniture rests.

Alternatively, Bushey, U.S. Pat. No. 7,234,199 discloses a furniture glide for mounting on the terminal end of a furniture leg having an outer surface. The furniture glide includes a base having a generally arcuate lower surface for engaging a supporting surface. A sleeve extends from the base and defines a cavity for receiving the furniture leg therein. The sleeve includes a leg engagement element for engaging the furniture leg received within the cavity and for allowing the furniture leg to be supported within the cavity at an angle thereto. However, the addition of the sleeve to the furniture glide substantially increases the overall cost of such glide.

Therefore, it is a primary object and feature of the present invention to provide a furniture glide that may be securely retained on a leg of a piece of furniture.

It is a further object and feature of the present invention to provide a furniture glide that is inexpensive to manufacture and simple to utilize.

It is a still further object and feature of the present invention to provide a furniture glide that may be utilized on the leg of a piece of furniture to prevent damage to the flooring on which the piece of furniture sits.

It is a still further object and feature of the present invention to provide a furniture glide that maintains engagement with a supporting surface when positioned at an angle to the terminal end of a furniture leg on which the furniture glide is mounted.

In accordance with the present invention, a furniture glide is provided that is mountable on the terminal end of a furniture leg having an outer surface. The furniture glide includes a base having an upper surface, a lower surface for engaging a supporting surface and an outer periphery. A sidewall extends from the outer periphery of the base and has an inner surface defining a cavity for receiving the furniture leg and an outer surface. Matted material is molded into the lower surface of the base and the outer surface of the sidewall.

The inner surface of the sidewall may intersect the upper surface of the base at an acute angle. In addition, the inner and outer surfaces may be generally parallel or the inner and outer surfaces may diverge. An adhesive is provided on the upper surface of the base. The adhesive is engageable with the terminal end of the furniture leg. It is contemplated for the sidewall to be fabricated from an elastic material.

In accordance with a further aspect of the present invention, a furniture glide is provided that is mountable on the terminal end of a furniture leg having an outer surface. The furniture glide includes a cup having an outer surface and an inner surface defining a cavity for receiving the furniture leg. Matted material is molded into the outer surface of the cup.

The cup includes a base and a sidewall. The base has an upper surface, a lower surface for engaging a supporting surface and an outer periphery. The sidewall extends from the outer periphery of the base and has an inner surface and an outer surface. The inner surface of the sidewall may intersect the upper surface of the base at an acute angle. The inner and outer surfaces may be generally parallel such that the sidewall has a generally uniform thickness or the inner and outer surfaces of the sidewall may diverge. An adhesive may be provided on the upper surface of the base. The adhesive is engageable with the terminal end of the furniture leg. The sidewall is fabricated from an elastic material.

In accordance with a still further aspect of the present invention, a furniture glide is provided that is mountable on the terminal end of a furniture leg having an outer surface. The furniture glide includes a base having an upper surface, a lower surface for engaging a supporting surface and an outer periphery. A sidewall extends from the outer periphery of the base and has an inner surface defining a cavity for receiving the furniture leg and an outer surface. An adhesive is provided on the upper surface of the base. The adhesive is engageable with the terminal end of the furniture leg. Matted material is molded into the outer surface of the sidewall.

The inner surface of the sidewall may intersect the upper surface of the base at an acute angle. The sidewall may have a generally uniform thickness or the inner and outer surfaces of the sidewall may diverge. It is contemplated for the sidewall to be fabricated from an elastic material and for the matted material to be molded into the lower surface of the base.

DESCRIPTION OF THE DRAWINGS

Figure 1:
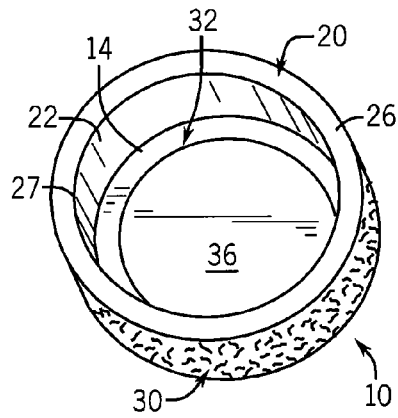
FIG. 1 is an isometric view of a furniture glide in accordance with the present invention.
Figure 2:
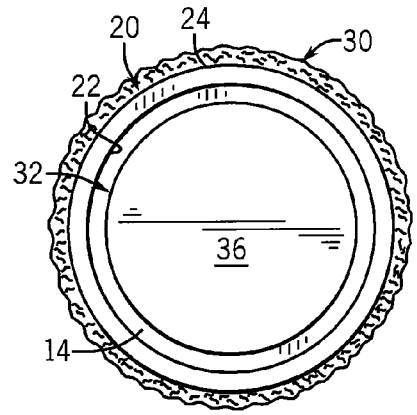
FIG. 2 is a top plan view of the furniture glide of FIG. 1.

Referring to FIGS. 1-4, a furniture glide in accordance with the present invention is generally designated by the reference numeral 10. Furniture glide 10 includes a base 12 having a generally flat upper surface 14, a generally flat bottom surface 16 and an outer periphery 15. Sidewall 20 extends vertically from upper surface 14 of base 12 at a location adjacent outer periphery 15 of base 12. Sidewall 20 includes an inner surface 22 and an outer surface 24 interconnected by upper face 26. Upper face 26 of sidewall 20 intersects inner surface 22 of sidewall 20 at an inner edge 27 which, in turn, defines an opening 29. Inner surface 22 of sidewall 20 and upper surface 14 of base 12 define cavity 28 in furniture glide 10 for receiving a chair leg or the like. It is contemplated for sidewall 20 to be fabricated from an elastic material such as vinyl so as to allow the diameter of opening 29 to increase in order for furniture glide 10 to accommodate and snuggly retain furniture legs of different shapes and sizes within cavity 28. Further, while furniture glide 10 has a generally circular configuration, other configurations, such as squares, ovals or the like, are possible without deviating from the scope of the present invention.

Figure 3:
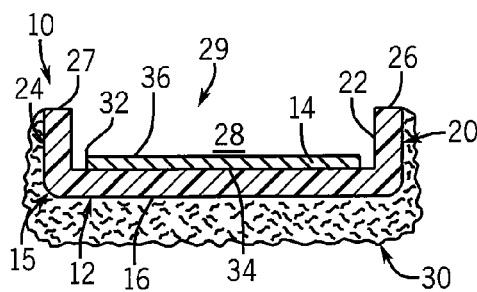
FIG. 3 is a cross-sectional view of the furniture glide of the present invention taken along line 3-3 of FIG. 2.
Figure 4:
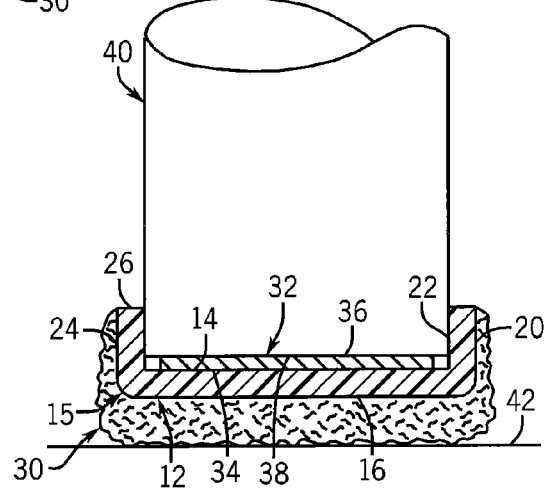
FIG. 4 is a side elevational view, partially in section, showing the furniture glide of FIG. 1 mounted on a foot of a leg of a piece of furniture.
Figure 5:
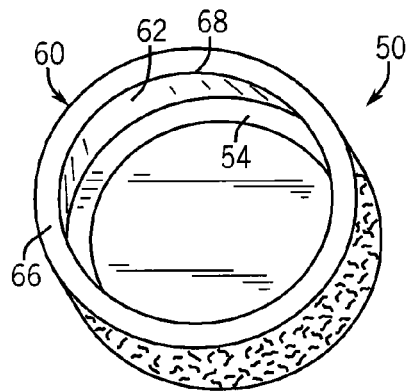
FIG. 5 is an isometric view of a further embodiment of a furniture glide in accordance with the present invention.

As best seen in FIGS. 3-4, it is contemplated to cover bottom surface 16 of base 12 and outer surface 24 of sidewall 20 with matted material 30 such as felt. Preferably, matted material 30 is molded, imbedded or fused into bottom surface 16 of base 12 and outer surface 24 of sidewall 20 of furniture glide 10. An adhesive pad 32 is positioned on upper surface 14 of base 12 within the cavity 28. Adhesive pad 32 includes a lower surface 34 fixed by an adhesive to upper surface 14 of base 12 and an upper surface 36 having a layer of adhesive provided thereon. Adhesive pad 32 may be fabricated from one or more layers of any resilient type material, including plastic foam, felt or rubber.

In operation, in order to mount furniture glide 10 on terminal end 38 of furniture leg 40 of a piece of furniture (not shown), terminal end 38 of furniture leg 40 is inserted through opening 29 into cavity 28 of furniture glide 10. It is contemplated for sidewall 20 to expand to accommodate furniture legs of different sizes and shapes and to snuggly retain furniture glide 10 on furniture leg 40. As furniture leg 40 is inserted into cavity 28 in furniture glide 10, terminal end 38 of furniture leg 40 engages and is bonded to upper surface 36 of adhesive pad 34, and hence to upper surface 14 of base 12, thereby securing furniture glide 10 on terminal end 38 of furniture leg 40. Once furniture glide 10 has been secured to terminal end 38 of furniture leg 40, the piece of furniture may be positioned such that matted material 30 along bottom surface 16 of furniture glide 10 engages supporting surface 42. Thereafter, the piece of furniture may be slid along supporting surface 42 on furniture glide 10.

It can be appreciated that as the piece of furniture is slid along supporting surface 42, sidewall 20 acts to discourage furniture glide 10 from shearing off terminal end 38 of furniture leg 40. In addition, it is understood that in the event that furniture glide 10 is positioned at an angle to terminal end 38 of furniture leg 40, matted material 30 along outer surface 24 of sidewall 20 will engage supporting surface 42 thereby protecting supporting surface 42 as the piece of furniture is slid therealong.

Figure 6:
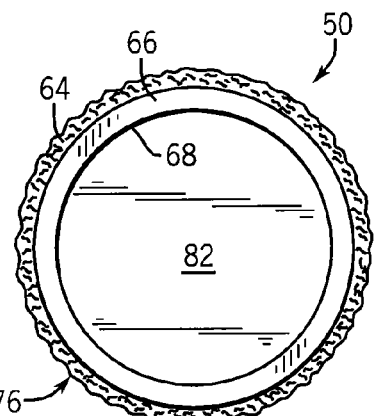
FIG. 6 is a top plan view of the furniture glide of FIG. 5.
Figure 7:
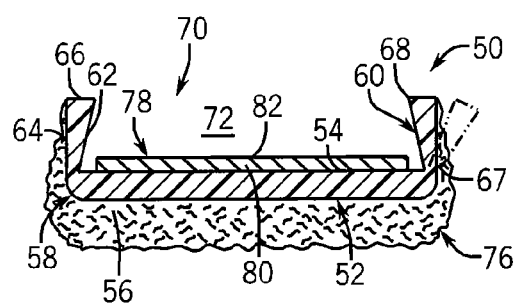
FIG. 7 is a cross-sectional view of the furniture glide of the present invention taken along line 7-7 of FIG. 6.
Figure 8:
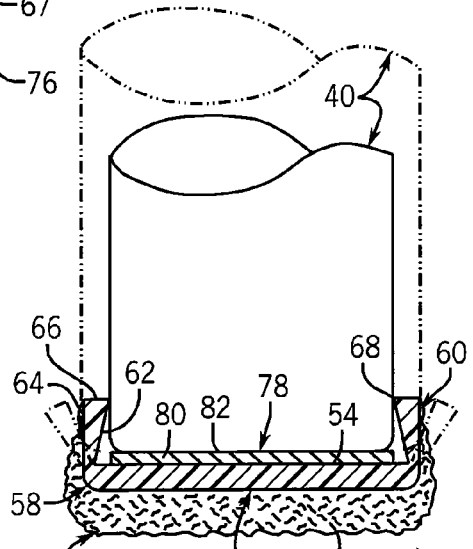
FIG. 8 is a side elevational view, partially in section, showing the furniture glide of FIG. 5 mounted on a foot of a leg of a piece of furniture.

Referring to FIGS. 5-8, an alternate embodiment of a furniture glide in accordance with the present invention is generally designated by the reference numeral 50. Furniture glide 50 includes a base 52 having a generally flat upper surface 54, a generally flat bottom surface 56 and an outer periphery 58. Sidewall 60 extends vertically from upper surface 54 of base 52 at a location adjacent outer periphery 58 of base 52. Sidewall 60 includes an inner surface 62 and an outer surface 64 interconnected by upper face 66. As best seen in FIGS. 7-8, inner and outer surfaces 62 and 64, respectively, of sidewall 60 extend from pivot point 67 at the outer periphery of base 52 and diverge from each other. Upper face 66 of sidewall 60 intersects inner surface 62 of sidewall 60 at an inner edge 68 which, in turn, defines an opening 70. Inner surface 62 of sidewall 60 and upper surface 54 of base 52 intersect each other at an acute angle, for reasons hereinafter described. In addition, inner surface 62 of sidewall 60 and upper surface 54 of base 52 define cavity 72 in furniture glide 50 for receiving a furniture leg or the like. It is contemplated for sidewall 60 to be fabricated from an elastic material such as vinyl so as to allow sidewall 60 to pivot on pivot point 67. By allowing sidewall 60 to pivot on pivot point 67, it can be appreciated that the diameter of opening 70 may increase in order for furniture glide 10 to accommodate and snuggly retain furniture legs of different shapes and sizes within cavity 72.

As best seen in FIGS. 6-8, it is contemplated to cover bottom surface 56 of base 52 and outer surface 64 of sidewall 60 with a matted material 76 such as felt. Preferably, matted material 76 is molded, imbedded or fused into bottom surface 56 of base 52 and outer surface 64 of sidewall 60 of furniture glide 50. An adhesive pad 78 is positioned on upper surface 54 of base 52 within the cavity 72. Adhesive pad 78 includes a lower surface 80 fixed by an adhesive to upper surface 54 of base 52 and an upper surface 82 having a layer of adhesive provided thereon. Adhesive pad 78 may be fabricated from one or more layers of any resilient type material, including plastic foam, felt or rubber.

In operation, in order to mount furniture glide 50 on terminal end 38 of furniture leg 40 of a piece of furniture (not shown), terminal end 38 of furniture leg 40 is inserted through opening 70 into cavity 72 of furniture glide 50. It is contemplated for sidewall 60 to pivot on pivot point 67 to expand to accommodate furniture legs of different sizes and shapes and to snuggly retain furniture glide 10 on furniture leg 40, FIGS. 7-8. As furniture leg 40 is inserted into cavity 72 in furniture glide 50, terminal end 38 of furniture leg 40 engages and is bonded to upper surface 80 of adhesive pad 78, and hence to upper surface 54 of base 52, thereby securing furniture glide 50 on terminal end 38 of furniture leg 40. Once furniture glide 50 has been secured to terminal end 38 of furniture leg 40, the piece of furniture may be positioned such that matted material 76 along bottom surface 56 of furniture glide 50 engages supporting surface 42. Thereafter, the piece of furniture may be slid along supporting surface 42 on furniture glide 50.

It can be appreciated that as the piece of furniture is slid along supporting surface 42, sidewall 60 acts to discourage furniture glide 50 from shearing off terminal end 38 of furniture leg 40. In addition, it is understood that in the event that furniture glide 50 is positioned at an angle to terminal end 38 of furniture leg 40, matted material 76 along outer surface 64 of sidewall 60 will engage supporting surface 42 thereby protecting supporting surface 42 as the piece of furniture is slid therealong.

Figure 9:
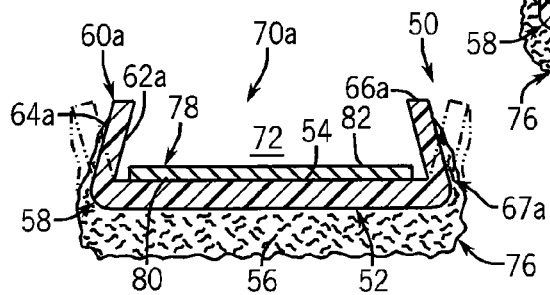
FIG. 9 is a cross-sectional view, similar to FIG. 7, showing a still further embodiment of the furniture glide of the present invention.

It is contemplated for furniture glide 50 to incorporate an alternate sidewall generally designated by the reference numeral 60a. Sidewall 60a is defined inner surface 62a and outer surface 64b that are generally parallel to each other and interconnected by upper face 66a, FIG. 9. Inner and outer surfaces 62a and 64a, respectively, of sidewall 60a extend from pivot point 67a at the outer periphery of base 52, as heretofore described. Upper face 66a of sidewall 60a intersects inner surface 62a of sidewall 60a at an inner edge 68a which, in turn, defines an opening 70a. Inner surface 62a of sidewall 60a and upper surface 54 of base 52 intersect each other at an acute angle.

In operation, in order to mount furniture glide 50 on terminal end 38 of furniture leg 40 of a piece of furniture (not shown), terminal end 38 of furniture leg 40 is inserted through opening 70a into cavity 72 of furniture glide 50. It is contemplated for sidewall 60a to pivot on pivot point 67 to expand to accommodate furniture legs of different sizes and shapes and to snuggly retain furniture glide 10 on furniture leg 40, FIGS. 7-8. As furniture leg 40 is inserted into cavity 72 in furniture glide 50, terminal end 38 of furniture leg 40 engages and is bonded to upper surface 80 of adhesive pad 78, and hence to upper surface 54 of base 52, thereby securing furniture glide 50 on terminal end 38 of furniture leg 40. Once furniture glide 50 has been secured to terminal end 38 of furniture leg 40, the piece of furniture may be positioned such that matted material 76 along bottom surface 56 of furniture glide 50 engages supporting surface 42. Thereafter, the piece of furniture may be slid along supporting surface 42 on furniture glide 50.

It can be appreciated that as the piece of furniture is slid along supporting surface 42, sidewall 60a acts to discourage furniture glide 50 from shearing off terminal end 38 of furniture leg 40. In addition, it is understood that in the event that furniture glide 50 is positioned at an angle to terminal end 38 of furniture leg 40, matted material 76 along outer surface 64a of sidewall 60a will engage supporting surface 42 thereby protecting supporting surface 42 as the piece of furniture is slid therealong.

Figure 10:
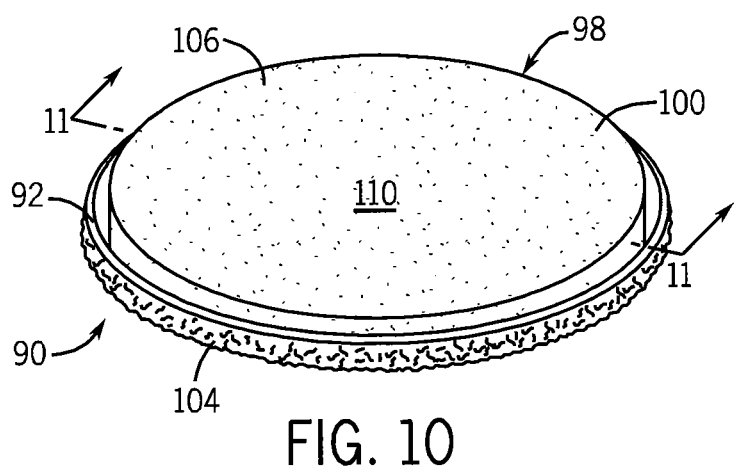
FIG. 10 is an isometric view of a still further embodiment of a furniture glide in accordance with the present invention.
Figure 11:
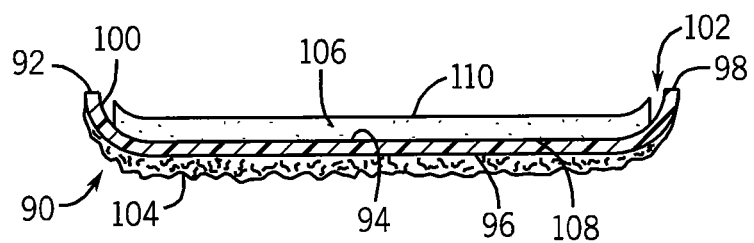
FIG. 11 is a cross-sectional view of the furniture glide of the present invention taken along line 11-11 of FIG. 10.

Referring to FIGS. 10-11, a still further embodiment of a furniture glide in accordance with the present invention is generally designated by the reference numeral 90. Furniture glide 90 includes a base 92 having a generally concave upper surface 94, a generally convex bottom surface 96 and an outer periphery 98. Outer periphery 98 of base 92 defines an opening 102 in furniture glide 90. Upper surface 94 of base 92 defines cavity 100 in furniture glide 90 that communicates with opening 102 for receiving the terminal end of a chair leg or the like.

It is contemplated to fabricate base 92 from a pliable vinyl material. However, base 92 may be fabricated from other materials without deviating from the scope of the present invention. It can be appreciated that the pliable vinyl material adjacent outer periphery 98 of base 92 may be stretched so as to allow the diameter of opening 102 of furniture glide 90 to increase in order for furniture glide 90 to accommodate and snuggly retain furniture legs of different shapes and sizes within cavity 100. Further, while furniture glide 90 has a generally circular configuration, other configurations, such as squares, ovals or the like, are possible without deviating from the scope of the present invention.

It is contemplated to cover bottom surface 96 of base 92 with matted material 104 such as felt or fabric. Preferably, matted material 104 is needle punched, molded, imbedded or fused into bottom surface 96 of base 92 of furniture glide 90. Pad 106 is positioned on upper surface 94 of base 92 within the cavity 100. Pad 106 includes a lower surface 108 fixed by an adhesive to upper surface 94 of base 92 and an upper surface 110 for receiving the terminal end of furniture leg or the like thereon. Pad 106 may be fabricated from one or more layers of any resilient type material, including plastic foam, felt or rubber.

In operation, terminal end 38 of furniture leg 40 may be inserted through opening 102 into cavity 100 of furniture glide 90. Outer periphery 98 of base 92 may expand to accommodate furniture legs of different sizes and shapes. As furniture leg 40 is inserted into cavity 100 in furniture glide 90, terminal end 38 of furniture leg 40 engages upper surface 110 of pad 106. Once terminal end 38 of furniture leg 40 is positioned on furniture glide 90, the piece of furniture may be slid along supporting surface 42 on matted material 104 of furniture glide 90.

Various modes of carrying out the invention are contemplated as being within the scope of the following claims particularly pointing out and distinctly claiming the subject matter which is regarded as the invention.

I claim:

1. A furniture glide mountable on the terminal end of a furniture leg having an outer surface, comprising:
   a base having an upper surface, a lower surface and an outer periphery;
   a sidewall extending from the outer periphery of the base and having an inner surface defining a cavity for receiving the furniture leg and an outer surface, the sidewall including:
      an upper portion having a thickness;
      a lower portion adjacent the base, the lower portion having a thickness less than the thickness of the upper portion;
      the inner surface of the sidewall intersecting the upper surface of the base at an acute angle; and
   matted material imbedded in the lower surface of the base and the outer surface of the sidewall so as to bond the matted material to the base;
   wherein the inner and outer surfaces of the sidewall diverge from the upper surface of base to the upper portion of the sidewall.

2. The furniture glide of claim 1 further comprising an adhesive on the upper surface of the base, the adhesive engageable with the terminal end of the furniture leg.

3. The furniture glide of claim 1 where the sidewall is fabricated from an elastic material.

4. A furniture glide mountable on the terminal end of a furniture leg having an outer surface, comprising:
   a cup defining a cavity for receiving the furniture leg, the cup including:

a base portion having an upper surface, a lower surface for engaging a supporting surface and an outer periphery; and a sidewall extending from the outer periphery of the base and having an inner surface and an outer surface, the sidewall including:

an upper portion having a thickness; and a lower portion adjacent the base, the lower portion having a thickness less than the thickness of the upper portion; and matted material imbedded in the outer surface of the cup, thereby bonding the matted material to the cup;

wherein:

the inner surface of the sidewall intersects the upper surface of the base at an acute angle; and the inner and outer surfaces of the sidewall diverge from the upper surface of base to the upper portion of the sidewall.

5. The furniture glide of claim 4 further comprising an adhesive on the upper surface of the base, the adhesive engageable with the terminal end of the furniture leg.

6. The furniture glide of claim 4 where the sidewall is fabricated from an elastic material.

7. The furniture glide of claim 4 wherein the sidewall is moveable between a first position wherein the inner surface of the sidewall intersects the upper surface of the base at an acute angle and an second position wherein the sidewall intersects the upper surface of the base at an angle of at least 90 degrees.

8. The furniture glide of claim 7 wherein the sidewall is urged toward the first position.

9. A furniture glide mountable on the terminal end of a furniture leg having an outer surface, comprising:

a base having an upper surface, a lower surface and an outer periphery;

a sidewall extending from the outer periphery of the base, the sidewall having:

an upper portion having a thickness;

a lower portion adjacent the base, the lower portion having a thickness less than the thickness of the upper portion;

an inner surface defining a cavity for receiving the furniture leg; and an outer surface; and matted material imbedded in the outer surface of the sidewall, thereby bonding the matted material to the sidewall;

wherein:

the inner surface of the sidewall intersects the upper surface of the base at an acute angle; and the inner and outer surfaces of the sidewall diverge from the upper surface of base to the upper portion of the sidewall.

10. The furniture glide of claim 9 further comprising an adhesive on the upper surface of the base, the adhesive engageable with the terminal end of the furniture leg.

11. The furniture glide of claim 9 where the sidewall is fabricated from an elastic material.

12. The furniture glide of claim 9 wherein the sidewall is moveable between a first position wherein the inner surface of the sidewall intersects the upper surface of the base at an acute angle and an second position wherein the sidewall intersects the upper surface of the base at an angle of at least 90 degrees.

13. The furniture glide of claim 12 wherein the sidewall is urged toward the first position.

\* \* \* \* \*